T. MIDGLEY AND R. B. NAYLOR.
TREATMENT OF RUBBER ARTICLES.
APPLICATION FILED OCT. 21, 1920.

1,394,928.

Patented Oct. 25, 1921.
3 SHEETS—SHEET 1.

INVENTORS.
Thomas Midgley.
Ralph B. Naylor.
BY
ATTORNEY.

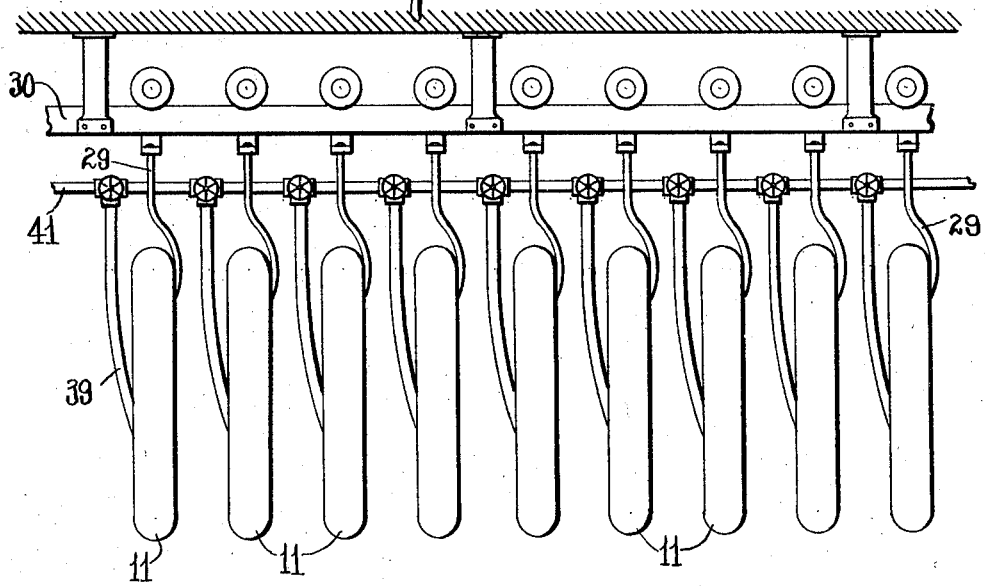
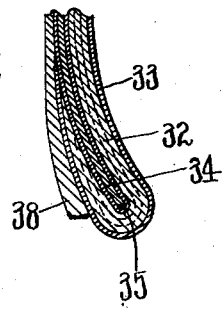
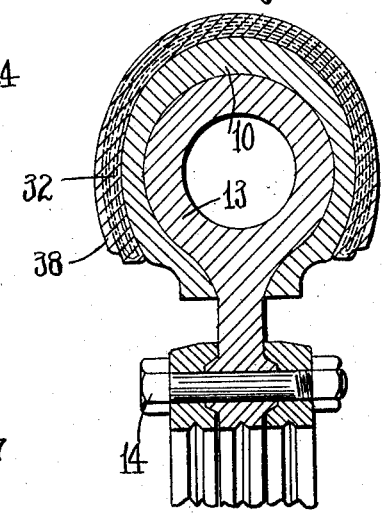
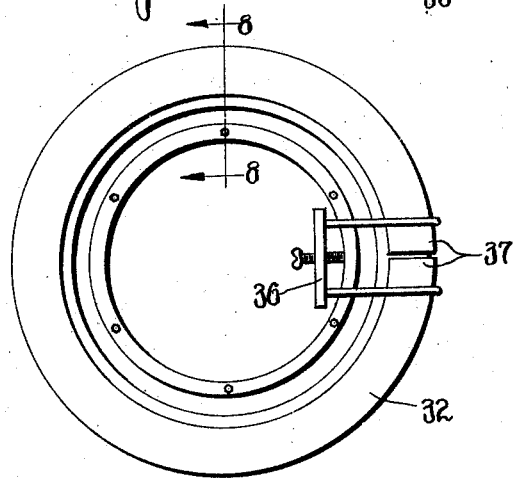

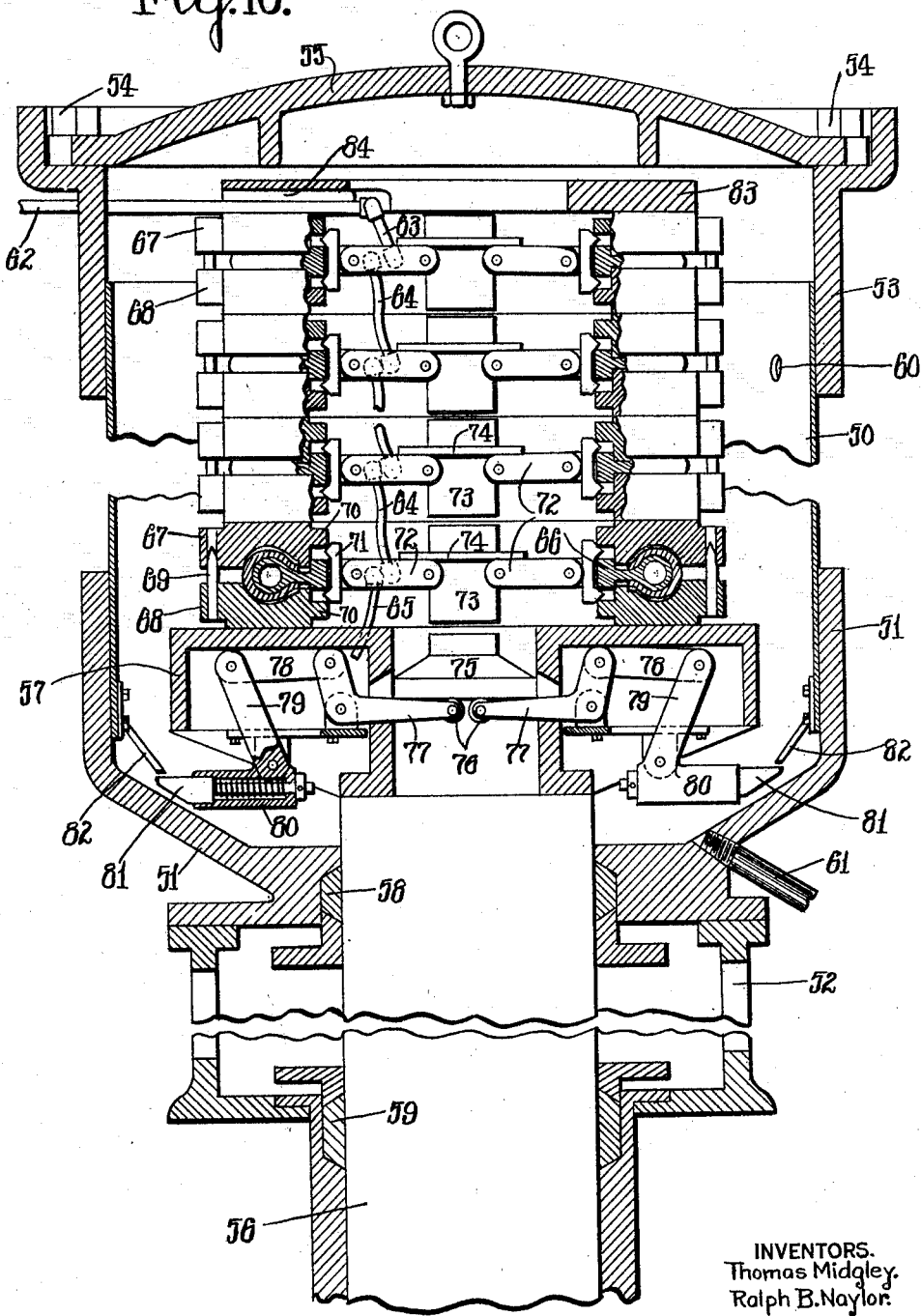

UNITED STATES PATENT OFFICE.

THOMAS MIDGLEY, OF HAMPDEN, AND RALPH B. NAYLOR, OF SPRINGFIELD, MASSACHUSETTS, ASSIGNORS TO THE FISK RUBBER COMPANY, OF CHICOPEE FALLS, MASSACHUSETTS, A CORPORATION OF MASSACHUSETTS.

TREATMENT OF RUBBER ARTICLES.

1,394,928.  Specification of Letters Patent.  Patented Oct. 25, 1921.

Application filed October 21, 1920. Serial No. 418,520.

*To all whom it may concern:*

Be it known that we, THOMAS MIDGLEY, residing at Hampden, county of Hampden, State of Massachusetts, and RALPH B. NAYLOR, residing at Springfield, county of Hampden, State of Massachusetts, have invented certain new and useful Improvements in Treatment of Rubber Articles, of which we declare the following to be a full, clear, and exact description.

This invention relates to methods of treating and vulcanizing laminated articles made of rubber and fabric, such for example as the outer casings or shoes used in pneumatic tires.

It has for its object improvements in the vulcanization of tire casings, particularly as to processes in which it is desired to finally mold the casing under a large degree of pressure, particularly such as is exerted between rigid mold members serving to impress a non-skid pattern upon the tread portion of the casing.

In carrying out our method the carcass and tread portions of the casing are assembled and the assembled casing is subjected to locally applied heat to augment the difference between the resistances to flow or movement of the tread and the carcass under molding pressure. This heat may be locally applied to the outside of the casing to soften the tread, care being taken not to soften the carcass as well, or, as we prefer, it may be applied to the inside of the casing so that as the heat proceeds from the inside outwardly the casing will become regionally partially vulcanized. The internal application of heat is discontinued when substantially the whole carcass has become partially vulcanized sufficiently to withstand without permanent distortion a later-applied tread forming pressure, leaving the outside of the tread portion of the casing substantially unvulcanized and in a condition to conform to such a tread-molding pressure. The preliminary regional vulcanization also preferably establishes a partially vulcanized bond between the carcass and the tread. After the assembled casing has been so regionally partially vulcanized a tread-molding pressure, such as exerted between a rigid core and split rigid molds, is applied, and the casing subjected to heat until vulcanization is complete.

It is sometimes desirable to surround the casing during the preliminary vulcanization with a heat insulating medium, which may also furnish a preliminary bonding pressure. This medium prevents radiation of heat from the outside of the casing while the rubber of the fibrous portions is being vulcanized by heat supplied from the inside, thereby saving heat and shortening the time of curing. We have also found that this heat insulation insures a better distribution of heat and overcomes any tendency toward over-curing of those fabric layers in immediate contact with the heating core while permitting a proper distribution of heat for the regional vulcanization. Heat insulation may be furnished by an asbestos blanket drawn upon the outside of the tire, by an asbestos covering over preliminary molds such as will be described, or by spiral wrappings of asbestos or other tape or bands applied in the same way in which tires have been wrapped with fabric for other vulcanizing operations.

It is desirable to have a bonding pressure acting upon the outside of the casing during vulcanization since a laminated rubber structure will cure into a more integral structure when it is under a compacting pressure than when it is not under such pressure. For this reason in the preferred manner of practising our invention the casing is kept under mold pressure during both the regional and the final vulcanizations, the character of the molds used in the two stages differing, however, as will appear. The mold pressure used during the regional vulcanization is of such a nature that its action is either substantially normal to the casing or away from the crest of the casing, so that it acts to hold the fabric or cord material of which the carcass is built in place upon the core instead of acting to shift it toward the crest of the core, and will thus maintain during vulcanization the conditions of tension and location in the fabric determined when the tire carcass is built. After the preliminary or regional vulcanization has been carried out to the desired degree under this character of pressure the casing is subjected to mold pressure acting to shift the covering rubber into the configuration or pattern which it is desired that the finished casing should have. The final molds may, for example, shift and mold the covering rubber into a non-skid design. The difference between the action of the preliminary molds and the final molds in this preferred method may be pointed out concisely by stating that in the preliminary vulcanization the molds, while they may smooth out minor inequalities in the outer rubber of the casing, are designed to conform substantially to the contour of the casing as built and to hold the casing in that condition; whereas in the final vulcanization the covering rubber of the casing is forced to conform to the mold, which is designed to impart a definite finished form to the casing.

The preliminary or regional vulcanization may also be given without the heat insulation and banding pressure or without either of them. For example, the regional vulcanization may be given by heating the casing from the inside while the outside of the casing is subjected to substantially normal atmospheric conditions. The regional vulcanization may also be performed in an ordinary vulcanizing heater, while the casing and core are inclosed in the usual compression molds, these molds being held slightly separated by any suitable means, either being spaced from the casing or resting upon it to provide a bonding pressure, and heat being supplied through the cores rather than through the heater itself. After the partial vulcanization the molds may be closed and the final vulcanization performed in the usual way, heat being supplied by steam admitted to the interior of the heater. During the regional vulcanization in the last named process, air pressure may, or may not be introduced into the heater as found desirable. Another way in which the regional vulcanization can be carried out is by inclosing the casing mounted on the core in a flexible mold such for example, as a metal shell containing a pneumatic cushion. It will be understood that while many of the advantages of our invention will be found in the modified procedures outlined above, its advantages become more marked in the preferred embodiment.

Our invention will now be described with particular reference to the accompanying drawings, in which—

Fig. 6 is a view showing a series of cores and tire casings mounted on an overhead track and illustrating one method of performing the first vulcanizing operation;

Fig. 7 is a side elevation of a core with a casing and an asbestos blanket thereon;

Fig. 8 is a cross-section on line 8—8 of Fig. 7;

Fig. 9 is an enlarged detail of one side of the asbestos blanket, showing one manner in which it may be constructed; and Fig. 10 is a section of a vulcanizer pot showing another method of practising our invention.

Figure 1:
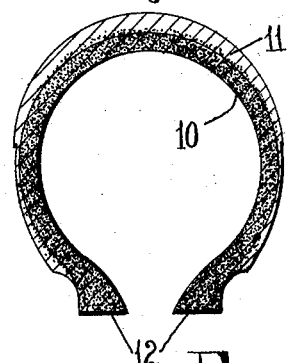
Figure 1 is a cross section of a tire casing at an intermediate stage of the vulcanizing process, the progress of vulcanization being indicated by stippling.
Figure 2:
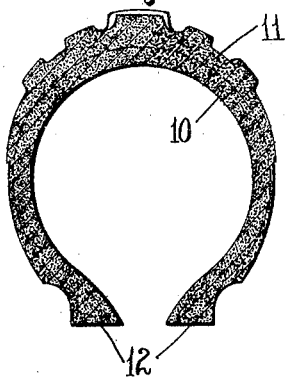
Fig. 2 is a view similar to Fig. 1 showing the completely vulcanized casing.

The tire casing shown in Figs. 1 and 2 may be built up in any desired manner, and is composed generally of a carcass portion 10, a tread portion 11, and bead members 12. The carcass is composed of suitable layers of fibrous material impregnated or covered with rubber, and the tread is usually composed of rubber alone. In one standard form of casing, the carcass is built up of layers of rubberized cords laid on in the form of sheet material commonly known as cord fabric. After the tire is completely built up the first step of the preferred embodiment of our process is to partially vulcanize the carcass without substantailly vulcanizing the major portion of the tread. The progress of the vulcanization at the end of this step is shown diagrammatically by the stippling in Fig. 1.

To secure this preliminary regional vulcanization the preferred method comprises mounting the casing upon a core (which may be the one on which the casing is constructed) and in heating the core until the desired degree of vulcanization is attained. As illustrated in Fig. 1, this regional vulcanization extends through the carcass and preferably sufficiently into the tread to establish a partially vulcanized bond between the carcass and tread.

Figure 3:
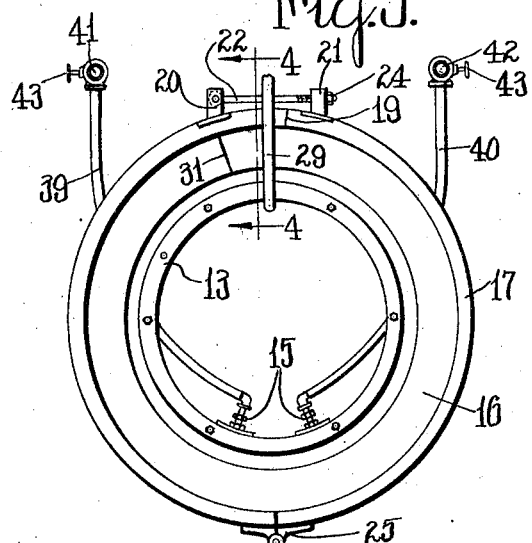
Fig. 3 is a side elevation showing a casing mounted on a core for the first vulvanizing step, with our preferred form of preliminary mold in place.
Figure 4:
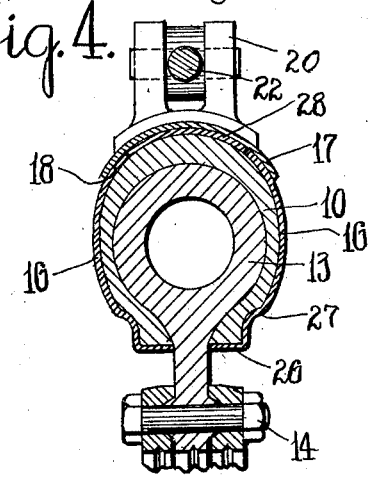
Fig. 4 is a cross-section thereof on line 4—4 of Fig. 3.

In Figs. 3 and 4 a tire casing is shown arranged in the preferred manner for the securing of this regional vulcanization. The casing is mounted upon a hollow core 13 which, if the casing is of the type having inextensible beads, may be formed of a plurality of sections held together by bolts 14 in a well known manner. Provision is made for the circulation of steam through the several sections by any suitable steam connections. Connection to an outside source of steam supply may be made at the points 15. The interior of the core is arranged so as to cause the circulation of the steam from the inlet around the interior of the core to the outlet by means of the connections at points 15. This may be accomplished by closing the direct passage in the interior of the core between points 15.

As previously stated, it is desirable to subject the casing during the preliminary regional vulcanization to a bonding mold pressure. As means for accomplishing this end I have shown a mold composed of side-plates 16 and a top plate 17 (Figs. 3 and 4). The top plate bears on the side plates as shown at 18 and is arranged to be contracted so that it will both press down toward the tread of the casing and will by its contact with the side-plates draw the latter inwardly toward the sides of the tire. In order to contract the top plate, which is split as at 19, preferably with a beveled joint, we provide lugs 20 and 21, one on each side of the joint 19, and a bolt 22 pivoted to lug 20 and fitting in a slot in lug 21. A nut 24 serves to draw the two lugs toward each other and thus contract the top plate. For convenience in operation the top plate is hinged at 25 at a point opposite joint 19. The inner portion of the side-plates may be shaped as at 26 to correspond with the shape of the beads of the casing or they may terminate at the lower portion of the sidewalls at about the point indicated by 27. The inside of the top plate has a filler 28 which serves to bridge the gap in between the two side-plates as will be apparent in Fig. 4. In order to facilitate the positioning and removal of the side plates over a hook 29 which may support the core on an overhead track 30 one or both of the side plates may be split as at 31. It will be clear from this description that the mold will serve to give a pressure to the casing which will be normal through the exterior of the casing or in a direction away from the crest thereof, instead of being in a direction to crowd the material toward the crest of the casing as is the case with the usual form of split molds.

Figure 5:
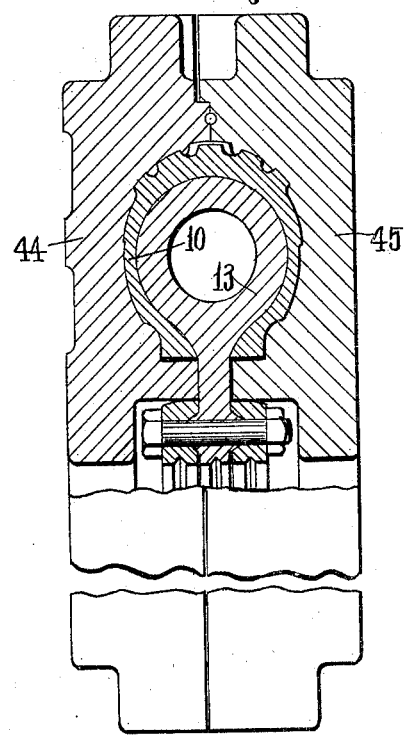
Fig. 5 is an elevation of an assembled mold, partly in section, showing the final step in the vulcanizing process.

The final cure, which changes the regional vulcanization shown diagrammatically in Fig. 1 to the uniform vulcanization of Fig. 2, may be performed in any usual way. If a non-skid pattern is desired as is usually the case, however, it is preferable to inclose the regionally vulcanized casing between rigid mold members 44 and 45 shaped to impress the desired configuration upon the casing, and held together by hydraulic pressure in the usual manner. This final step is illustrated in Fig. 5, it being understood that the mold is heated in any customary or desired way, as by surrounding it with an atmosphere of steam.

As previously stated, it is sometimes desirable to use a heat insulation around the outside of the casing during the preliminary vulcanization. This means may take the form of an outer covering of insulating material placed about the jacket previously described or may consist in a blanket such as is illustrated in Figs. 7, 8, and 9. Referring particularly to Figs. 7, 8, and 9, this blanket is constructed of a suitable thickness of asbestos 32 protected by a layer of fabric 33. Springs 34, closely spaced circumferentially of the blanket and suitably shaped to conform to and hug the casing, and inclosed by a sheathing of fabric 35, serve to give the desired pressure about the casing. This pressure will be in a direction tending to hold the cords or threads of which the casing is built in the position in which they are laid, rather than to distort them toward the crest of the casing as is the case with molds of the usual form. The clasping pressure of the blanket as also of the three part mold previously described serves also to prevent the separation of the materials of which the casing is composed due to the expansion of entrapped air and moisture or liberated gases. It is found desirable in some instances in order to insure an even pressure of the blanket throughout the circumference of the core, to provide a strap clamp or similar device indicated generally at 36, which will keep the ends 37 of the blanket closely against the casing. Elsewhere on the blanket the springs 34 will provide the necessary pressure. If desired, a strip of vulcanized rubber 38 may be attached to the sides of the blanket to add to the body of the blanket and maintain its form, particularly at the edges, so as to hug the bead edges of the casing in a better manner.

A convenient way for supporting the cores and casings during the regional vulcanization is illustrated in Figs. 3 and 6 where the cores with the casings thereon are supported by hooks 29 from the overhead track 30. Connection may be made to the steam couplings 15 by flexible pipes 39 and 40 with steam mains 41 and 42, one of which may serve for a supply and the other for exhaust. Valves 43 provide means for controlling the steam. The three part molds and blankets described above have not been illustrated as, while the use of one or the other is preferred, their illustration is not necessary in these figures.

Another way in which our improved process may be carried out is illustrated in Fig. 10, which shows a heater fitted up with means for maintaining separation of the mold members until the regional vulcanization is completed. All of the same advantages will not follow this procedure as in the case where the three part mold shown in Figs. 3 and 4 is used but certain advantages will be gained as will appear.

The heater comprises a cylinder 50 mounted on a casting 51, supported on a foundation 52. To cylinder 50 is secured a head 53 with inwardly projecting lugs 54 under which a removable cover 55 is held. Movable through the foundation and the casting 51 is a hydraulic plunger 56, under which water pressure is introduced by any suitable means. A table 57 is carried on the flanged top of plunger 56. By controlling the water pressure under the plunger the table may be raised and lowered, and a pile of molds and tires placed on the table can be pressed with any desired force against the cover 55. Leakage of water past the plunger 56 is prevented by stuffing boxes 58 and 59. Provision is made, as by an inlet 60, and outlet 61, for furnishing compressed air, steam, or water to the inside of the heater. All the above parts are old and well known in the art and need not be described further.

The tire casings are mounted on the internally chambered ring cores previously described. Connection is made to the hollow interior of the cores by an inlet pipe 62 connected to the top core by a short pipe 63. The chambers of the several cores are joined by flexible tubes 64, and the bottom core is connected to an outlet by a flexible tube 65. In this manner the connections of two pipes to each core provides for a circulation in the cores in the same manner as described in connection with Figs. 3 and 4. The inner circumference of the cores are formed with enlarged portions or flanges 66 by which the cores are positioned as will appear later.

Surrounding each core is a split mold composed of an upper section 67 and a lower section 68. These sections are guided relative to each other by dowels 69 fastened in the lower section and running in holes in the upper section. Each section has an inwardly projecting annular lug 70 by which the sections of each mold are held apart as will be described. The forming faces of the mold sections are shaped to give the desired form to the tire and may be provided with the usual raised and depressed portions as indicated in Fig. 5 which will produce a pattern or non-skid tread, although such pattern has not been shown in Fig. 10.

Fitting between flanges 66 of the cores and lugs 70 of the molds are double wedges 71, which when held outwardly will hold the mold sections apart out of contact with the casing or in relatively light contact therewith according to the design of the wedges 71, and will position the core midway between them. These wedges form part of what may be termed a toggle unit. One toggle unit is provided for each of the split molds, and preferably there are three wedges, equally spaced circumferentially, to each unit. Each wedge is pivoted by a pin to a pair of arms 72 which straddle an inwardly extending lug on the wedge. The other ends of these arms are pinned to a lug on head 73. Head 73 is provided with a flange 74, which serves as an abutment to prevent the arms 72 swinging upwardly beyond the position shown. In this position the arms are slightly higher than the line of their pivots on head 73, and hence, once they have been placed in this position, the pressure exerted by the mold sections on the wedges will prevent the arms swinging downwardly past the line of their pivots and the breaking of the toggle thus formed.

The thickness of head 73 is preferably such that when the molds and toggle units are stacked on top of one another a slight space will be left between adjacent heads, as shown in the figure. This is to allow the toggles to be broken one at a time by the mechanism about to be described. Running in a bearing in table 57 is a block 75, whose bottom rests upon rollers 76 at the ends of bell-cranks 77, and whose top is arranged to abut against the lowest head 73. The other end of each bell-crank 77 is connected by a link 78 to another bell-crank 79 pivoted to the table 57. The lower end of bell-crank 79 is formed into a tubular sleeve 80 in which runs a spring pressed pawl 81. The outer end of this pawl is adapted to engage a depending lug 82 attached to casting 51. When the parts are in the position shown in the figure the pile of molds reaches nearly to the cover, and in this type of heater the mold pressure for the final vulcanization is obtained by forcing the pile against the cover by the hydraulic plunger 56. As the plunger is raised, the outer ends of pawls 81 catch under the lugs 82 and the upper ends of bell-cranks 79 are swung outwardly, causing the inner ends of bell-cranks 77 to be raised, thus raising the block 75. As this block abuts against the lowest head 73 the latter is raised, swinging toggle arms 72 past their dead center. When the toggle is thus broken the weight of the molds piled on top of the lowest one will force the wedges of that one inwardly, thus forcing the lowest head 73 upwardly until it impinges against the second from the bottom head. In this manner the breaking of the toggles proceeds successively from bottom to top of the pile. If desired the space between heads 73 may be decreased by thickening the heads so that all the toggles will be broken substantially simultaneously by the raising of block 75, but the present construction is preferable in some instances where the molds are held out of contact with the casings, as it avoids heavy shock due to the simultaneous collapse of all the molds, which are very heavy. It will be noted that the molds may be collapsed and the vulcanizing pressure applied without removing the cover from the heater. This both saves time and avoids cooling of the molds and casings with consequent loss of heat and interruption in the vulcanizing process.

A plate 83 with a cutaway portion 84 is placed on the top of the pile of molds to allow pressure to be exerted by the pile against the cover 55 without injuring the pipe 47.

On the descent of the plunger 56 pawls 81 will slip by lugs 82 on account of their spring mounting. If the plunger is raised with no molds upon it or with a pile not reaching to the top of the heater the pawls will be engaged by the lug as described, and will break the toggles of whatever units are supported by the plunger, but will then tilt past the lugs and allow the plunger to ascend freely.

In carrying out our invention with this form of apparatus the cover 55 is removed, the table 57 brought near the top of the heater, and the lower half of the bottom mold laid on. A core, with a tire casing mounted thereon, is taken and a toggle unit sprung into position with the inner wedge surfaces engaging flange 66 of the core. This core and toggle unit is then laid on the mold, the lower part of the wedges engaging lugs 70 on the mold, thus securing registration of the core and mold. The tubes 65 and 64 are connected, and the upper section of the mold laid on, registration being secured by the dowels 69 as well as the action of the wedges. Subsequent molds and cores are laid on in a similar manner and the top core connected with tube 63. The wedges 71 not only serve to keep the mold sections separated, but also to maintain the cores centralized. When all the molds have been laid on, the cover is clamped down and heat applied through the chambered portion of the ring core. The outside of the casings may be subjected during this part of the process to the action of compressed air to prevent "blowing" due to the expansion of entrapped gases. Instead of using compressed air the molds may be brought together with sufficient contact with the casings for this purpose. This may be accomplished by properly designing the holding wedges for such contact. The heads 73 in this instance may be designed to contact one with another so as to cause the simultaneous breaking of the toggle units since there will be no substantial fall of the mold parts. When it is desired to apply the full pressure of the molds to the tire casings for the final vulcanization it is merely necessary to admit pressure under the hydraulic plunger. The upward motion of this plunger both withdraws the wedges from their operative position and forces the pile of molds against the lower side of the cover as described. The heating of the tire casings is then continued, either by continuing the supply of steam to the interior of the cores, or by admitting steam to the inside of the heater, or by both.

While we have described several methods of accomplishing the broad results of our invention, it will be understood that we prefer to carry on both the preliminary and the final vulcanization under mold pressure, the character of that pressure, however, differing in the two cases as pointed out above. In the claims we have defined the invention both in its broader and in its preferred embodiments.

We claim:

1. The method of treating a tire casing comprising assembling the carcass and tread portions thereof, applying heat regionally to the assembled casing in such a manner as to augment the difference between the resistances to flow of the tread and the carcass whereby the tread is enabled to conform to a molding pressure when applied without displacing the carcass, and then applying molding pressure to the casing and vulcanizing it.

2. The method of vulcanizing a tire casing comprising assembling the carcass and tread portions thereof, heating the assembled casing from the inside outwardly until the casing is partially vulcanized substantially through the carcass but leaving the tread in a condition to conform to a molding pressure, and then applying a tread molding pressure to the casing and completing the vulcanization.

3. The method of vulcanizing a tire casing comprising assembling the carcass and tread portions thereof, heating the assembled casing from the inside outwardly until the casing is partially vulcanized substantially through the carcass and a partially vulcanized bond is created between the tread and the carcass but the outer portion of the tread is left substantially unvulcanized, and then applying a tread molding pressure to the casing and completing the vulcanization.

4. The method of vulcanizing a tire casing comprising assembling the carcass and tread portions thereof, heating the assembled casing from the inside outwardly while the outside of the casing is protected by a heat insulation until the casing is partially vulcanized substantially through the carcass but leaving the tread in a condition to conform to a molding pressure, and then applying a tread molding pressure to the casing and completing the vulcanization.

5. The method of vulcanizing a tire casing comprising assembling the carcass and tread portions thereof, heating the assembled casing from the inside outwardly while the casing is held by a bonding pressure until the casing is partially vulcanized substantially through the carcass but leaving the tread in a condition to conform to a molding pressure, and then applying a tread molding pressure to the casing and completing the vulcanization.

6. The method of vulcanizing a tire casing comprising assembling the carcass and tread portions thereof upon a rigid core adapted to be heated, heating the assembled casing from the inside outwardly by heat supplied through the core until the casing is partially vulcanized substantially through the carcass but leaving the tread in a condition to conform to a molding pressure, and then subjecting the casing to a tread molding pressure between a rigid core and rigid molding surfaces and completing the vulcanization.

7. The method of vulcanizing a tire casing comprising assembling the carcass and tread portions thereof upon a rigid core adapted to be heated, heating the assembled casing from the inside outwardly by heat supplied through the core while the casing is pressed against the core by a mold substantially conforming to the contour of the casing as built, the heating being continued until the casing is partially vulcanized substantially through the carcass but leaving the tread in a condition to conform to a molding pressure, and then subjecting the casing to a tread molding pressure between a rigid core and rigid molding surfaces and completing the vulcanization.

8. The method of vulcanizing a tire casing comprising assembling the carcass and tread portions thereof upon a rigid core, partially vulcanizing the carcass portion of the assembled casing without substantially vulcanizing the outer portion of the tread while the casing is pressed against the core by a mold substantially conforming to the contour of the casing as built, removing such pressure, and then subjecting the casing to a tread molding pressure between a rigid core and rigid molding surfaces and completing the vulcanization.

9. The method of vulcanizing a tire casing comprising assembling the carcass and tread portions, compressing the assembled casing between a rigid core and mold surfaces substantially conforming to the contour of the casing as built, giving to the assembled casing while so compressed a preliminary vulcanization serving to set the carcass elements in the condition in which they were laid, compressing the casing between a rigid core and mold members adapted to impart to the casing the molded design desired in the finished casing, and completing the vulcanization of the casing while compressed by said second mold members.

10. A method of vulcanizing tire casings in which the outside of the casing is protected by a heat insulation and heat is applied to the inside.

11. The process of vulcanizing tire casings comprising inclosing the casing in a heat insulating medium, applying heat to the inside of the casing until the vulcanization has proceeded part-way through the casing, and completing the vulcanization by heat applied to the outside of the casing.

12. The method of vulcanizing a tire casing comprising assembling the carcass and tread portions thereof, heating the assembled casing from the inside outwardly while the casing is held on the outside by a pressure sufficient to prevent the blowing of the tread rubber until the casing is partially vulcanized substantially through the carcass but leaving the tread in a condition to conform to a molding pressure, and then applying a tread molding pressure to the casing and completing the vulcanization.

THOMAS MIDGLEY.
RALPH B. NAYLOR.